Jan. 19, 1943. O. O. RIESER 2,308,829
ELECTROLYTE CONTROL DEVICE
Filed Nov. 7, 1939

INVENTOR.
OLIVER O. RIESER.
BY Allen & Allen
ATTORNEYS.

Patented Jan. 19, 1943

2,308,829

UNITED STATES PATENT OFFICE 2,308,829

ELECTROLYTE CONTROL DEVICE

Oliver O. Rieser, Oak Park, Ill., assignor to The Richardson Company, Lockland, Ohio, a corporation of Ohio Application November 7, 1939, Serial No. 303,296

7 Claims. (Cl. 136—178)

My invention relates to types of electrolyte control devices such as those set forth in the copending applications of Charles L. Keller, Serial No. 276,826, filed June 1, 1939, now matured into Patent No. 2,233,081, dated February 25, 1941, and my copending application Serial No. 296,667, filed September 26, 1939.

In electric storage batteries and particularly of the automotive type it is desirable not to overfill the battery with electrolyte, and the above-mentioned applications disclose electrolyte control means for batteries having a cell cover and a filler opening including a well. From the bottom of the well a tubular member passes downwardly to the desired normal electrolyte level. The bottom of the well has a gas venting perforation exterior to the tubular portion just mentioned; and within the well there is a weight operated valve member serving to close the vent perforation when the filler cap is removed. Thus as electrolyte is poured into the filler opening when the level of the electrolyte reaches the end of the tubular member, it will rise rapidly therein to give an indication when the cell has been filled to the proper level, and will prevent overfilling of the cell. When the filler cap has been placed in position to close the filler opening, it actuates the weight operated valve to open the vent perforation to provide for free egress of gases from the space above the electrolyte level.

It is an object of my invention to provide certain modifications and improvements upon the structures hereinabove referred to. It is particularly an object of my invention to provide an improved fulcrum arrangement for the weight operated valve member which is of a simplified construction and which is not likely to bind against the sides of the well or in any way to interfere with its proper functioning.

These and other objects of my invention which will be set forth hereinafter, or which will be apparent to one skilled in the art upon reading these specifications, I accomplish by that certain construction and arrangement of parts of which I shall now describe an exemplary embodiment. Reference is made to the drawing forming a part hereof, and in which—

I have shown only so much of a storage battery as is necessary to show the applicability of my invention, and I will therefore not describe the cell or battery box construction. The filler opening is generally indicated at 10, and is threaded as indicated at 11, to receive a filler cap 12. Centrally of the well and extending downwardly into the cell space is a tubular member 13, the bottom of which is disposed at the desired electrolyte level. Exterior to the tubular portion 13 is the vent opening 14.

Figure 1:
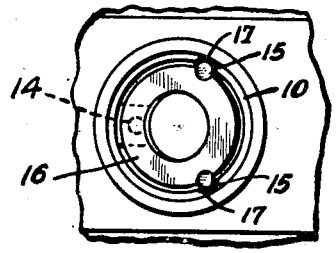
Figure 1 is a fragmentary plan view of a filler opening showing the weight actuated valve in place.

Grooves or slots 15 are provided extending vertically down the side of the well 10, said grooves being disposed generally opposite each other as shown in Fig. 1, but less than 180 degrees apart, so that a line connecting said grooves across the filler opening is not a diameter. These grooves form mounting means for the valve element, as will be pointed out hereinafter.

Figure 2:
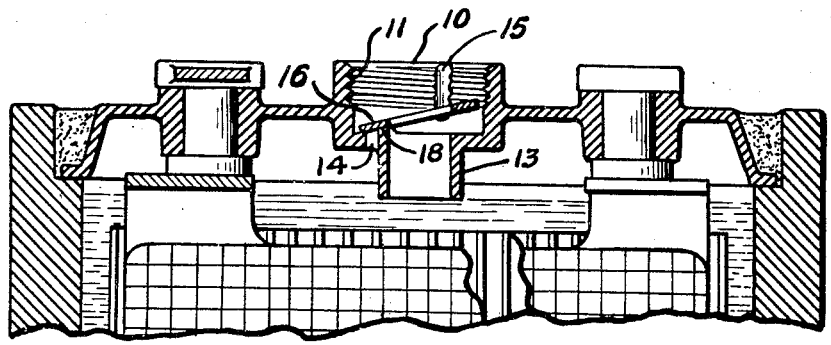
Fig. 2 is a partial longitudinal sectional view through the upper part of a storage battery cell and cell cover.
Figure 4:
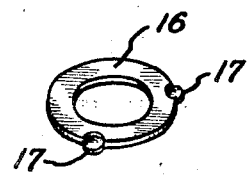
Fig. 4 is a perspective view of the weight operated valve member.

The valve member which is shown in detail in Fig. 4 is generally a flat ring shaped structure indicated generally at 16, and is provided with ears or pintles 17. It will be clear that the members 17 will be spaced apart circumferentially of the valve 16 in the same degree as the grooves 15, so that when the valve 16 is placed in the well 10, the members 17 will engage in the grooves 15 at the bottom thereof. The bottom of the well in the region of the vent 14 will be slightly sloped as indicated at 18 so as to form a flush seat for the valve 16 when it is in a closed position as shown in Fig. 2.

Figure 3:
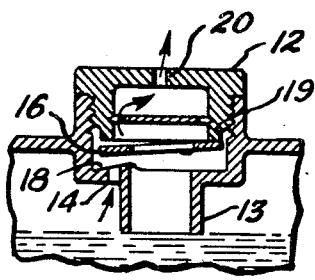
Fig. 3 is a fragmentary sectional view similar to Fig. 2, showing the filler opening in more detail and showing the filler cap in position.

It will now be clear that when the filler cap 12 is screwed into place the bottom thereof as indicated at 19, will bear against the upper part of the valve 16, depressing it until the valve occupies a substantially horizontal position, as shown in Fig. 3. It will be seen that when the valve is in the position of Fig. 2 with the filler cap screwed in place, the space above the electrolyte is vented through the opening 14, the hole in the center of the valve 16, and the vent 20 in the cap.

The construction shown in the drawing operates in the same manner substantially as those in the above mentioned copending cases, and the valve member is securely held against rotation and against planar displacement.

It will be clear that modifications will suggest themselves to those skilled in the art, and I therefore do not intend to limit myself otherwise than as pointed out in the claims which follow.

Having now fully described my invention, what I claim as new and desire to secure by Letters Patent is:

1. In an electrolyte control means for a storage battery having a cell cover provided with a filler opening in the form of a well, a vented filler cap for said opening and a tubular member of less internal diameter than the bottom of the well depending therefrom, the said bottom of the well having a gas vent perforation exterior to said tubular member; a weight operated valve member adapted to close said gas vent but not said tubular member, non-diametrically disposed pintle means on said valve, a pintle engaging means in the wall of said well, said engaging means being disposed to hold said valve in such a position when closing said gas vent that a portion of said valve extends upwardly of said pintles for valve opening engagement with said filler cap when the latter is in position to close said filler opening.

2. In an electrolyte control means for a storage battery having a cell cover provided with a filler opening in the form of a well, a vented filler cap for said opening and a tubular member of less internal diameter than the bottom of the well depending therefrom, the said bottom of the well having a gas vent perforation exterior to said tubular member; a weight operated valve member generally in the form of a perforated disk, non-diametrically disposed pintle means on said valve, a pintle engaging means in the wall of said well, said engaging means being disposed to hold said valve in a non-horizontal position when closing said gas vent whereby a portion of said valve extends upwardly of said pintles for valve opening engagement with said filler cap when the latter is in position to close said filler opening.

3. In an electrolyte control means for a storage battery having a cell cover provided with a filler opening in the form of a well, a vented filler cap for said opening and a tubular member of less internal diameter than the bottom of the well depending therefrom, the said bottom of the well having a gas vent perforation exterior to said tubular member; a weight operated valve member generally in the form of a perforated disk, a non-diametrically disposed pintle means on said valve and pintle engaging means in the wall of said well, an angularly disposed seat for said valve, said engaging means being disposed to hold said valve in a non-horizontal position to lie flush on the said seat when closing said gas vent, whereby a portion of said valve extends upwardly of said pintles for valve opening engagement with said filler cap when the latter is in position to close said filler opening.

4. A device according to claim 1, in which the pintle engaging means are constituted by vertically extending grooves in the wall of said well disposed to register with said pintles on said valves, said grooves being of such extent that when said valve is retained therein and is in position to close said gas vent, a portion of said valve extends upwardly of said pintles.

5. In an electrolyte control means for a storage battery, a cell cover having a filler opening in the form of a well, a tubular member depending from the bottom of said well and open therethrough, said tubular member being of smaller cross-sectional dimension than said well, whereby a shoulder is provided at the bottom of said well, said shoulder having a perforation therethrough exterior to said tubular member and a portion of said shoulder adjacent said perforation acting as a valve seat, a valve member in said well, perforated to permit filling through said tubular member, and adapted in one position to engage said seat and close said perforation, and cooperating configurations on said valve member and on the side wall of said well to prevent displacement of said valve member horizontally, and to provide a fulcrum for said valve member, said configurations comprising projections on said valve member and bottomed grooves in said side wall, terminating in such position as to raise said valve member from said bottom and cause it to assume under gravity a slanting position in said filler well in which position a portion of said valve member extends upwardly from said fulcrum.

6. In an electrolyte control means for a storage battery, a cell cover having a filler opening in the form of a well, a tubular member depending from the bottom of said well and open therethrough, said tubular member being of smaller cross-sectional dimension than said well, whereby a shoulder is provided at the bottom of said well, said shoulder having a perforation therethrough exterior to said tubular member and a portion of said shoulder adjacent said perforation acting as a valve seat, a valve member in said well, perforated to permit filling through said tubular member, and adapted in one position to engage said seat and close said perforation, and cooperating configurations on said valve member and on the side wall of said well to prevent displacement of said valve member horizontally, and to provide a fulcrum for said valve member, said configurations comprising projections on said valve member and bottomed grooves in said side wall, terminating in such position as to raise said valve member from said bottom and cause it to assume under gravity a slanting position in said filler well in which position a portion of said valve member extends upwardly from said fulcrum, in combination with a vented filler cap engageable in said filler opening and having a portion for contacting said valve and tilting it on said fulcrum.

7. In an electrolyte control means for a storage battery having a cell cover provided with a filler opening in the form of a well, a tubular member of less internal diameter than the bottom of the well depending therefrom, the said bottom having on one side a raised portion shaped to form a valve seat, and of minor area as respects the total area of said bottom, there being a gas vent perforation through said last mentioned portion and exterior to said tubular member, a weight operated valve member adapted when in weight actuated position to contact said valve seat portion and close said perforation, said valve member being cut away to permit filling through said tubular member, said valve member having pintle means, and pintle engaging means in the wall of said well so disposed as to retain said valve in weight actuated position out of contact with said bottom, excepting for said valve seat portion, whereby said valve may be actuated against gravity, by a pivotal movement on said pintle means, to a position out of contact with said valve seat portion.

OLIVER O. RIESER.